(12) United States Patent
Klecker et al.

(10) Patent No.: US 7,596,870 B2
(45) Date of Patent: Oct. 6, 2009

(54) FOLDING MULTIPURPOSE TOOL WITH SHEARS AND COMFORTABLE HANDLES

(75) Inventors: Glenn Klecker, Silverton, OR (US); Benjamin C. Rivera, West Linn, OR (US)

(73) Assignee: Leatherman Tool Group, Inc., Portland, OR (US)

(*) Notice: Subject to any disclaimer, the term of this patent is extended or adjusted under 35 U.S.C. 154(b) by 234 days.

(21) Appl. No.: 10/791,589

(22) Filed: Mar. 2, 2004

(65) Prior Publication Data

US 2005/0193498 A1 Sep. 8, 2005

(51) Int. Cl.
*B26B 13/04* (2006.01)
*B26B 13/16* (2006.01)

(52) U.S. Cl. .............. 30/236; 30/255; 30/261; 7/118; 7/129; 7/158

(58) Field of Classification Search ............ 7/125–131, 7/113, 118, 158; 30/255, 236, 123, 131, 30/134, 135, 146, 261
See application file for complete search history.

(56) References Cited

U.S. PATENT DOCUMENTS

| | | | |
|---|---|---|---|
| 2,501 A * | 3/1842 | Wendt | .......... 30/261 |
| 148,488 A | 3/1874 | Mosher | |
| 205,108 A | 6/1878 | Locke | |
| 310,439 A | 1/1885 | Kamak | |
| 403,500 A | 5/1889 | Wingenroth | |
| 405,642 A | 6/1889 | Woodle | |
| 406,524 A | 7/1889 | Jennings | |
| 459,409 A | 9/1891 | Maltby | |
| 486,560 A | 11/1892 | Dinkel | |
| 516,389 A | 3/1894 | Crutsinger | |
| 569,284 A | 10/1896 | Jacks | |
| 614,167 A | 11/1898 | Gardella | |
| 660,288 A | 10/1900 | Broadbooks | |
| 663,565 A * | 12/1900 | Fisher | .......... 30/261 |
| 799,617 A | 9/1905 | Steffa | |
| 835,791 A | 11/1906 | Kelly | |
| 867,514 A | 10/1907 | King | |
| 887,494 A | 5/1908 | Mulertz | |
| 1,196,278 A | 8/1916 | Poole | |

(Continued)

FOREIGN PATENT DOCUMENTS

DE 30788 3/1885

(Continued)

OTHER PUBLICATIONS

A.G. Russell™ Knives, Summer 2008, p. 29 (Letherman® Vista Hunting Pruner).*

(Continued)

*Primary Examiner*—Jason Daniel Prone
(74) *Attorney, Agent, or Firm*—Chernoff, Vilhauer, McClung & Stenzel, LLP

(57) ABSTRACT

A multipurpose tool includes bypass shears with handles that fold around the shears into a compact configuration in which the blades of the shears are hidden. A sharp-edged cutter is removable from the shears for resharpening or replacement. A blade safety lock holds the blades closed and is automatically engaged as the handles are folded. The handles are comfortably shaped and may include overmolded elastomeric cushioning portions.

17 Claims, 14 Drawing Sheets

U.S. PATENT DOCUMENTS

| | | | |
|---|---|---|---|
| 1,242,645 A | 10/1917 | Bockstahler | |
| 1,287,637 A | 12/1918 | Cobb | |
| 1,426,214 A * | 8/1922 | Rausse | 30/262 |
| 1,634,848 A | 7/1927 | Perrakis | |
| 1,666,253 A | 4/1928 | Blincoe | |
| 1,944,116 A | 1/1934 | Stratman | |
| 2,295,385 A | 9/1942 | Connors | |
| 2,310,959 A * | 2/1943 | James | 30/186 |
| 2,392,118 A * | 1/1946 | Cacarillo | 30/261 |
| 2,407,237 A | 9/1946 | Keiser, Jr. | |
| 2,439,071 A | 4/1948 | Basham | |
| 2,504,447 A | 4/1950 | Polincovsky | |
| 2,574,354 A | 11/1951 | Smith | |
| 2,650,423 A | 9/1953 | Phillips | |
| 2,662,286 A | 12/1953 | Yeomans | |
| 2,674,796 A | 4/1954 | Herold | |
| 2,721,386 A | 10/1955 | Habart | |
| 2,821,018 A | 1/1958 | Schwieso | |
| 2,938,266 A | 5/1960 | Klein, Jr. | |
| 3,100,343 A | 8/1963 | Wessel | |
| 3,357,287 A | 12/1967 | Wertepny, Sr. | |
| 3,572,192 A | 3/1971 | Juras | |
| 3,775,846 A | 12/1973 | Johnson | |
| 3,834,022 A * | 9/1974 | Students | 30/261 |
| 3,851,389 A | 12/1974 | Swanson | |
| 3,869,793 A | 3/1975 | Ferguson | |
| 4,079,513 A | 3/1978 | Harrison | |
| 4,094,064 A | 6/1978 | Nishikawa et al. | |
| 4,099,326 A | 7/1978 | Mori et al. | |
| 4,114,268 A | 9/1978 | Hildebrandt et al. | |
| 4,117,592 A | 10/1978 | Mori et al. | |
| 4,169,312 A | 10/1979 | Mar | |
| 4,203,208 A * | 5/1980 | Tausendfreundt et al. | 30/261 |
| 4,233,737 A | 11/1980 | Poehlmann | |
| 4,238,862 A | 12/1980 | Leatherman | |
| 4,283,854 A | 8/1981 | Austin | |
| 4,391,043 A | 7/1983 | Sizemore et al. | |
| 4,888,869 A | 12/1989 | Leatherman | |
| 4,891,882 A | 1/1990 | Bloom et al. | |
| 4,947,553 A | 8/1990 | Bendickson et al. | |
| 4,995,128 A | 2/1991 | Montgomery et al. | |
| 5,014,379 A | 5/1991 | Hull et al. | |
| 5,033,140 A | 7/1991 | Chen et al. | |
| 5,095,624 A | 3/1992 | Ennis | |
| 5,159,757 A | 11/1992 | Weid et al. | |
| 5,168,629 A | 12/1992 | Willard | |
| 5,189,794 A | 3/1993 | Kuo | |
| 5,203,084 A | 4/1993 | Kuo | |
| 5,243,762 A | 9/1993 | Orthey | |
| 5,245,721 A | 9/1993 | Lowe et al. | |
| 5,263,254 A | 11/1993 | Orthey | |
| 5,272,810 A | 12/1993 | Orthey | |
| 5,280,659 A | 1/1994 | Park | |
| 5,303,475 A | 4/1994 | Baker | |
| 5,359,778 A | 11/1994 | Seber et al. | |
| 5,426,857 A | 6/1995 | Linden | |
| 5,461,784 A | 10/1995 | Baron | |
| 5,483,747 A * | 1/1996 | Thompson et al. | 30/254 |
| 5,485,677 A * | 1/1996 | Seber | 30/294 |
| 5,511,310 A | 4/1996 | Sessions et al. | |
| 5,581,895 A | 12/1996 | Jeffcoat | |
| 5,621,974 A * | 4/1997 | Rose et al. | 30/260 |
| 5,628,115 A | 5/1997 | Hebert | |
| 5,653,525 A | 8/1997 | Park | |
| 5,692,304 A | 12/1997 | Campbell | |
| 5,697,114 A | 12/1997 | McIntosh et al. | |
| 5,711,194 A | 1/1998 | Anderson et al. | |
| 5,745,997 A | 5/1998 | Berg et al. | |
| 5,761,815 A | 6/1998 | Lin | |
| 5,765,247 A | 6/1998 | Seber et al. | |
| 5,769,094 A * | 6/1998 | Jenkins et al. | 30/161 |
| 5,781,950 A | 7/1998 | Swinden et al. | |
| 5,799,400 A | 9/1998 | Glesser | |
| 5,809,600 A | 9/1998 | Cachot | |
| 5,822,867 A | 10/1998 | Sakai | |
| 5,857,268 A | 1/1999 | Park | |
| D407,286 S | 3/1999 | Seber et al. | |
| 5,904,078 A | 5/1999 | Gustafson et al. | |
| 5,930,900 A | 8/1999 | Chang | |
| 5,933,893 A | 8/1999 | Padden | |
| 5,946,752 A * | 9/1999 | Parrish | 30/261 |
| 5,950,314 A | 9/1999 | Chang | |
| 5,960,498 A | 10/1999 | Nabors et al. | |
| 5,978,993 A | 11/1999 | Rivera | |
| 5,979,059 A | 11/1999 | Leatherman et al. | |
| 6,009,582 A | 1/2000 | Harrison et al. | |
| 6,014,787 A | 1/2000 | Rivera | |
| 6,038,723 A | 3/2000 | Nabors et al. | |
| 6,065,213 A | 5/2000 | Rivera | |
| 6,088,861 A | 7/2000 | Sessions et al. | |
| 6,098,225 A | 8/2000 | McIntosh et al. | |
| 6,108,845 A | 8/2000 | Hung et al. | |
| 6,128,805 A | 10/2000 | Rivera | |
| 6,151,999 A * | 11/2000 | Eklind | 81/440 |
| 6,233,769 B1 | 5/2001 | Seber et al. | |
| 6,243,901 B1 | 6/2001 | Elsener et al. | |
| 6,249,977 B1 | 6/2001 | Knoop | |
| 6,282,996 B1 | 9/2001 | Berg et al. | |
| 6,286,397 B1 | 9/2001 | Taggart et al. | |
| 6,289,768 B1 | 9/2001 | Anderson et al. | |
| 6,301,787 B2 | 10/2001 | Mock | |
| 6,305,041 B1 | 10/2001 | Montague et al. | |
| 6,336,272 B1 | 1/2002 | Lee | |
| 6,357,068 B1 | 3/2002 | Seber et al. | |
| 6,389,625 B1 | 5/2002 | Rivera | |
| 6,397,709 B1 | 6/2002 | Wall | |
| 6,418,626 B1 | 7/2002 | Jang | |
| 6,430,768 B2 | 8/2002 | McIntosh et al. | |
| 6,438,848 B1 | 8/2002 | McHenry et al. | |
| 6,446,344 B1 | 9/2002 | Gontar | |
| 6,481,034 B2 | 11/2002 | Elsener et al. | |
| 6,487,740 B2 | 12/2002 | Seber et al. | |
| 6,510,767 B1 | 1/2003 | Rivera | |
| 6,574,868 B1 | 6/2003 | Overholt | |
| 6,622,327 B1 | 9/2003 | Rivera | |
| 6,622,328 B2 | 9/2003 | Rivera | |
| 6,625,832 B2 * | 9/2003 | Montague et al. | 7/128 |
| 6,625,888 B2 | 9/2003 | Heck et al. | |
| 6,634,105 B2 | 10/2003 | Lindermeir | |
| 6,691,357 B2 | 2/2004 | Rivera | |
| 6,718,585 B2 | 4/2004 | McIntosh et al. | |
| 6,763,543 B2 | 7/2004 | Rivera | |
| 7,497,016 B1 * | 3/2009 | Wu | 30/261 |
| 2001/0018778 A1 | 9/2001 | Montague et al. | |
| 2002/0023524 A1 | 2/2002 | Lowe et al. | |
| 2002/0124415 A1 * | 9/2002 | Mizutani et al. | 30/261 |
| 2003/0014868 A1 | 1/2003 | Cech et al. | |
| 2003/0037644 A1 | 2/2003 | Rivera | |
| 2003/0062055 A1 | 4/2003 | Park | |
| 2004/0000058 A1 * | 1/2004 | Shyr | 30/261 |
| 2004/0010924 A1 * | 1/2004 | Hung et al. | 30/255 |
| 2004/0045167 A1 * | 3/2004 | Gringer et al. | 30/339 |
| 2004/0237204 A1 | 12/2004 | Rivera | |
| 2005/0150333 A1 | 7/2005 | Rivera | |
| 2005/0268468 A1 * | 12/2005 | Klecker et al. | 30/131 |
| 2007/0157771 A1 * | 7/2007 | Rivera | 81/177.4 |
| 2007/0204409 A1 * | 9/2007 | Yale et al. | 7/128 |
| 2007/0209121 A1 * | 9/2007 | Rivera | 7/128 |
| 2007/0294833 A1 * | 12/2007 | Rivera et al. | 7/128 |
| 2008/0236210 A1 * | 10/2008 | Frazer | 7/128 |

| | | |
|---|---|---|
| 2008/0271256 A1 * | 11/2008 | Frazer ............... 7/128 |

FOREIGN PATENT DOCUMENTS

| | | |
|---|---|---|
| DE | 145784 | 11/1903 |
| DE | 179077 | 11/1906 |
| DE | 2 322 229 | 5/1974 |
| EP | 0676261 | 10/1995 |
| EP | 0714736 A1 | 6/1996 |
| EP | 0854014 A1 | 7/1998 |
| EP | 08980742 A1 | 2/2000 |
| FR | 2 306 050 | 10/1976 |
| GB | 5375 | 11/1882 |
| GB | 21369 | 3/1895 |
| GB | 15859 | 9/1904 |
| JP | 3041991 | 2/1991 |
| WO | WO 98/18599 | 5/1998 |

OTHER PUBLICATIONS

R.C.E. Magnum Fish Tail Holder, Photocopy of packaging and digital photographs of product, at least as early as 1990, 5 pages.

"Fox Special" Folding Pliers, Photocopies of products, at least as early as 1990, 4 pages.

Bear MGC Product Catalog, Item No. 444SR depicting a fixed blade knife combined with serrated edge and gut hook, at least as early as 1996, 2 pages.

The Surecut Clipper Co., A Division of McGuire Industries, The Pocket Gardener, at least as early as Jan. 2003, photocopies of digital photos taken of product and packaging.

Remington Arms, Co., Brid Hunters Tool, at least as early as Jun. 2003, photocopies of digital photos taken of product and packaging.

The Rumford Gardener, 8 in 1 Gardener Tool, at least as early as Aug. 2003, photocopies of digital photos taken of product and packaging.

Office Action (including Examiner's search notes and references cited by both Examiner and Applicant) dated Jan. 9, 2008 from related U.S. Appl. No. 11/199,924; pp. 1-23.

Apr. 9, 2008 Response to Office Action (including 21 replacement drawing sheets) dated Jan. 9, 2008 from related U.S. Appl. No. 11/199,924; pp. 1-35.

Final Office Action (including Examiner's search notes and references cited by both Examiner and Applicant) dated Jul. 22, 2008 from related U.S. Appl. No. 11/199,924; pp. 1-15.

* cited by examiner

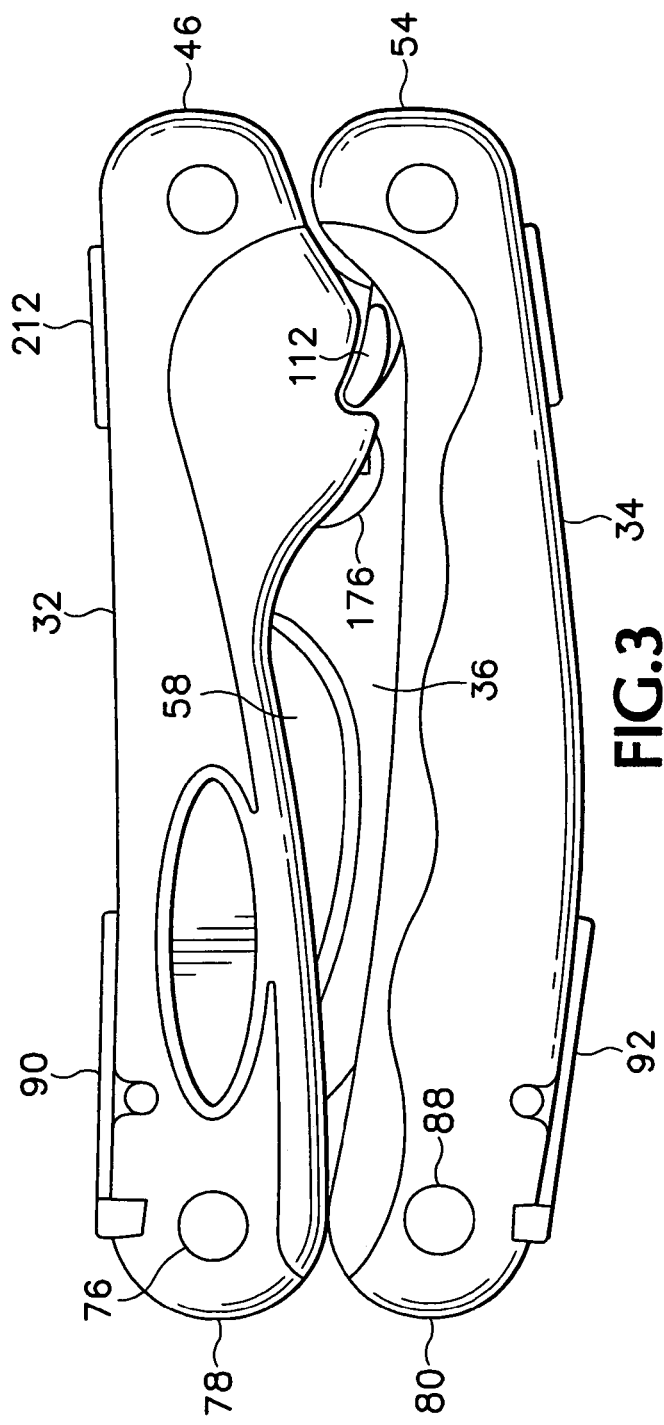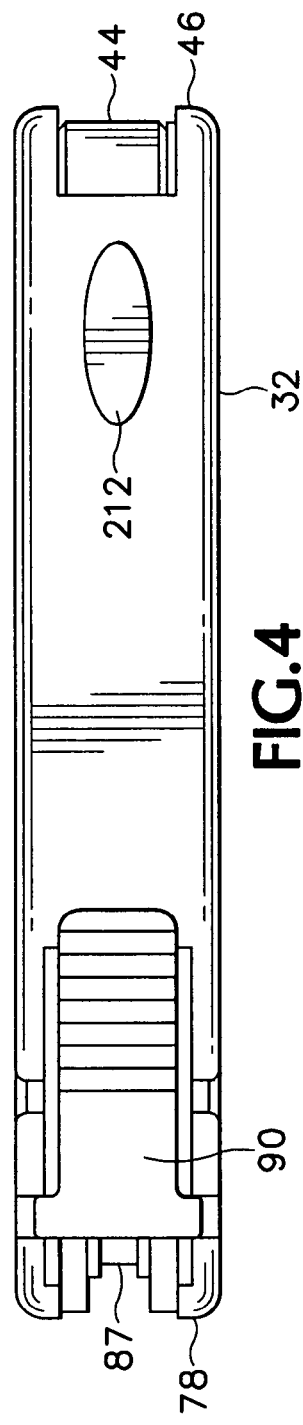
FIG. 3
FIG. 4

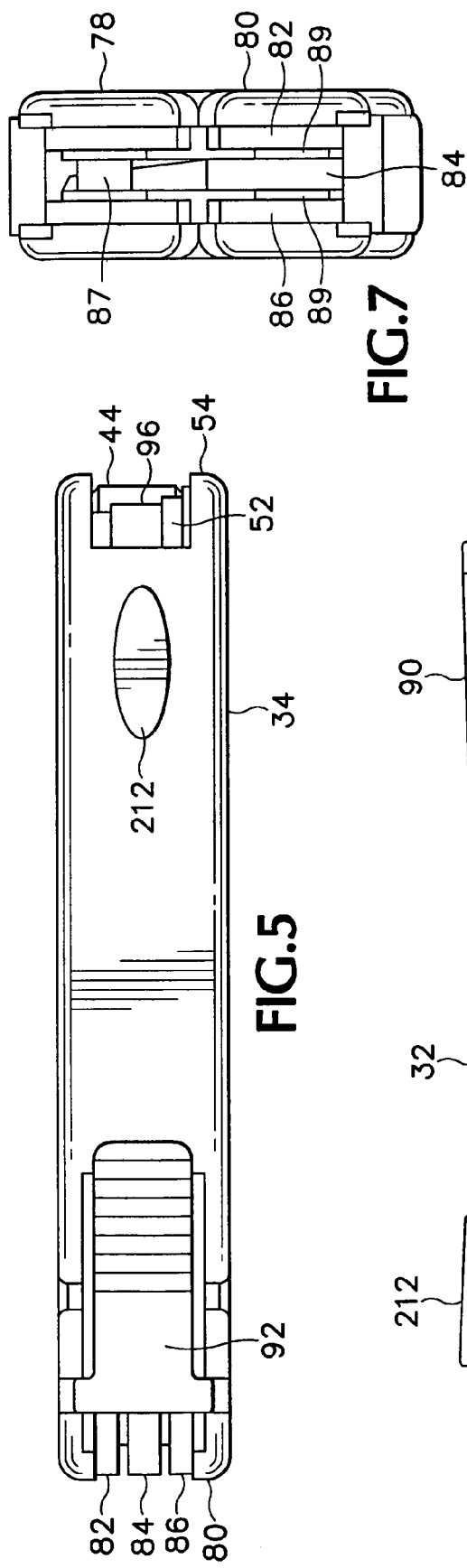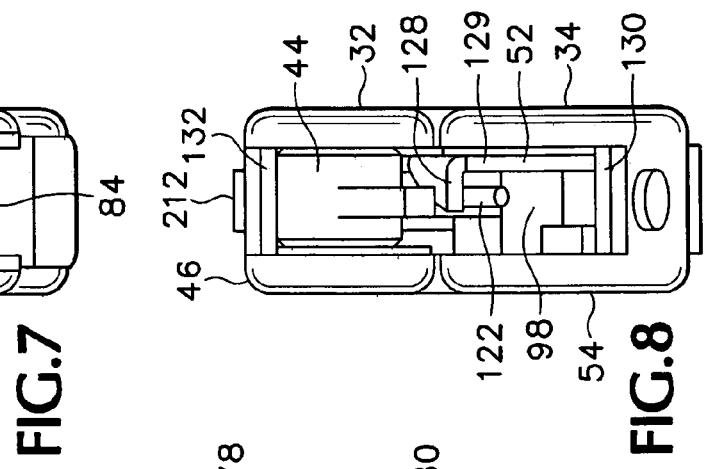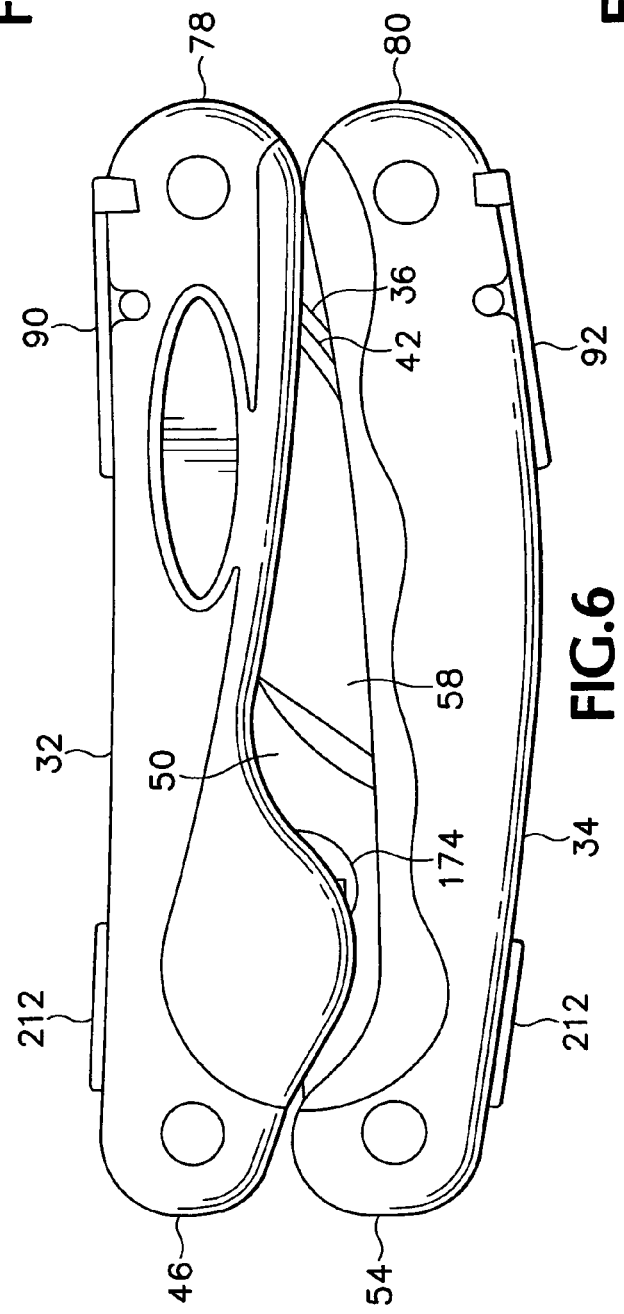

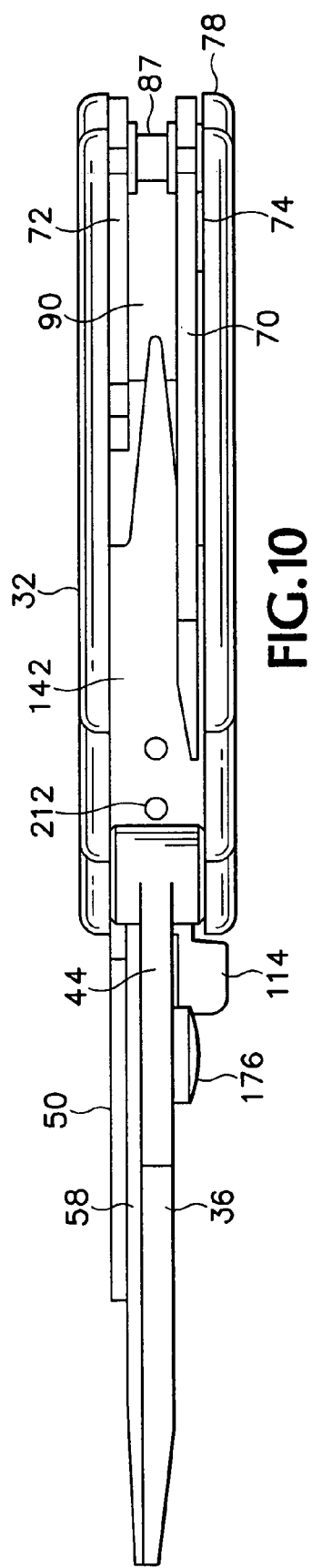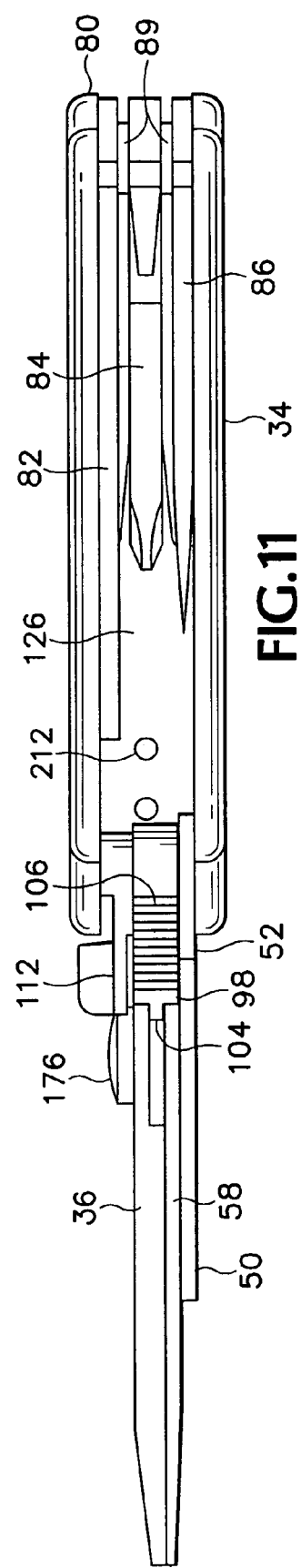

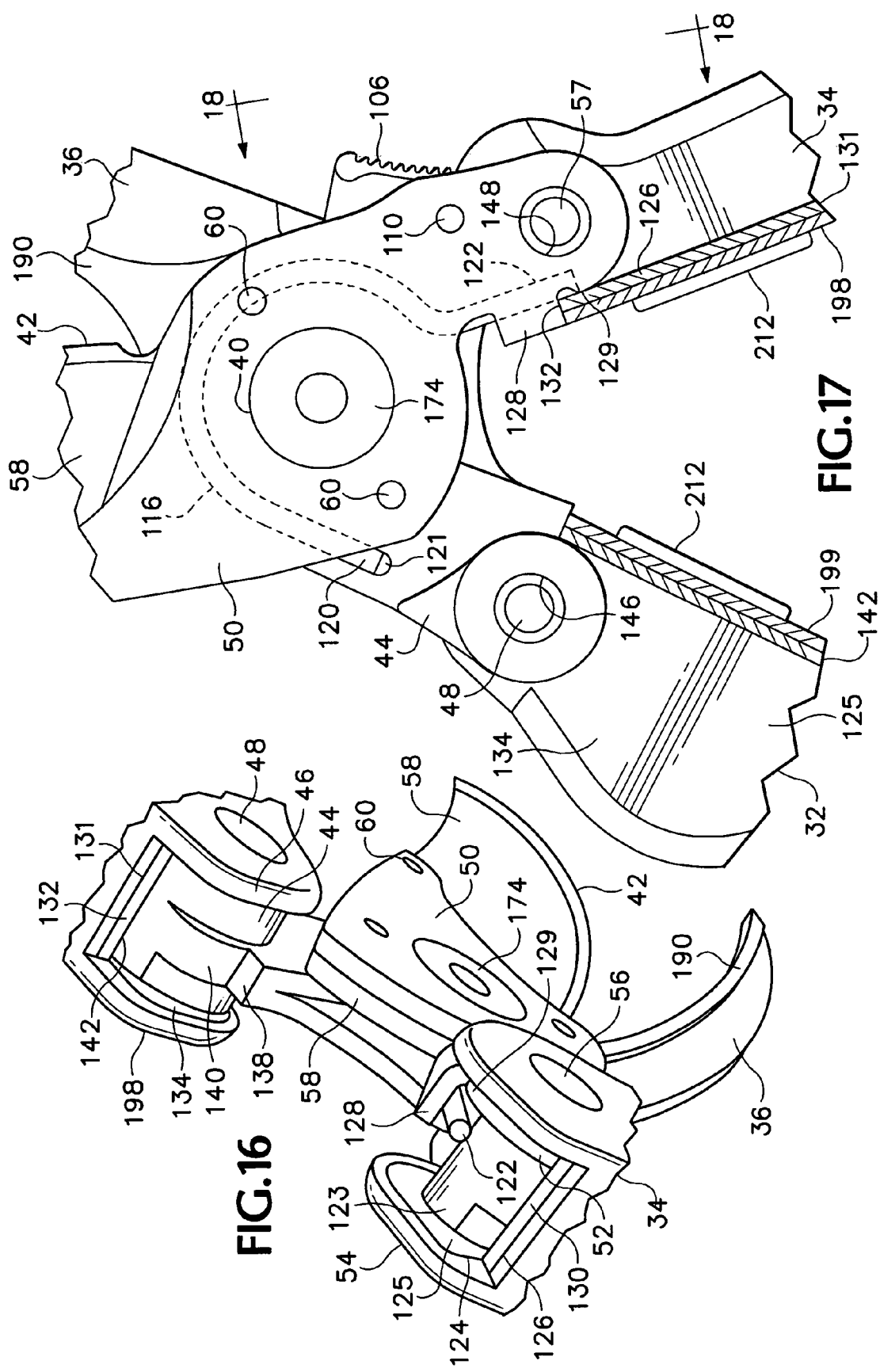

FOLDING MULTIPURPOSE TOOL WITH SHEARS AND COMFORTABLE HANDLES

BACKGROUND AND SUMMARY OF THE INVENTION

The present application relates to multipurpose hand tools that can be folded to a compact configuration, and particularly relates to such a tool including shears that are locked in a safe condition when the handles are closed, and whose handles are designed to be comfortable in use.

Multipurpose tools including shears and selected additional tools that can be folded into a compact configuration are known, and are available in various forms designed particularly for gardening or for use by bird hunters, for example. Previously known folding multipurpose tools designed for such uses, however, have not been particularly comfortable in use, and in some cases have required particular exercise of care to avoid injury from sharp edges of their blades.

What is desired, then, is a multipurpose tool that incorporates shears that can be folded into a safe, compact configuration, and that includes attractive and comfortable handles.

The present invention satisfies the aforementioned desires by providing a folding multipurpose tool as defined by the following claims.

In particular, one preferred embodiment of the invention includes a folding multipurpose tool including bypass shears including a jaw, a blade assembly including a blade carrier and a sharpened cutter mounted removably on the blade carrier, and handles connected to the jaw and to the blade carrier and movable between an extended, operative position of each and a folded position of each.

It is a feature of a folding multipurpose tool which is one embodiment of the invention that it includes a safety lock mechanism that latches the jaw and the blade assembly safely in a closed position in which the sharp edge of the cutter is not exposed, in response to folding the handles fully with respect to the jaw and blade assembly.

It is a feature of another preferred embodiment of a folding multipurpose tool according to the invention that at least one handle incorporates a strength member in the form of a channel having side walls and wherein such a handle includes molded cushioning portions attached to the side walls to provide for gripping the handle comfortably.

The foregoing and other features of the present invention will be understood more fully with reference to the following drawings and detailed description.

BRIEF DESCRIPTION OF THE DRAWINGS

FIG. 3 is a side elevational view of the tool shown in FIG. 1, taken from the same side as FIG. 1, with the handles folded around the shears.

FIG. 4 is a top plan view of the folded tool shown in FIG. 3.

FIG. 5 is a bottom plan view of the folded tool shown in FIG. 3.

FIG. 6 is a side elevational view of the folded tool shown in FIG. 3, taken from the opposite side.

FIG. 7 is an end elevational view of the folded tool shown in FIG. 3, taken from the left end of FIG. 3.

FIG. 8 is an end elevational view of the folded tool shown in FIG. 3, taken from the right end of FIG. 3.

FIG. 10 is a top plan view of the tool shown in FIG. 1.

FIG. 11 is a bottom plan view of the tool shown in FIG. 1.

FIG. 16 is an isometric view of a portion of the tool shown in FIG. 12, taken from the rear ends of the cutting blade assembly and jaw, and showing the handles in positions intermediate between extended and folded positions.

FIG. 17 is a partially cutaway view of a detail of the folding multipurpose tool shown in FIGS. 1-11, taken from the right side, with the handles thereof extended with respect to the blade assembly.

DETAILED DESCRIPTION OF THE PREFERRED EMBODIMENTS

Figure 1:
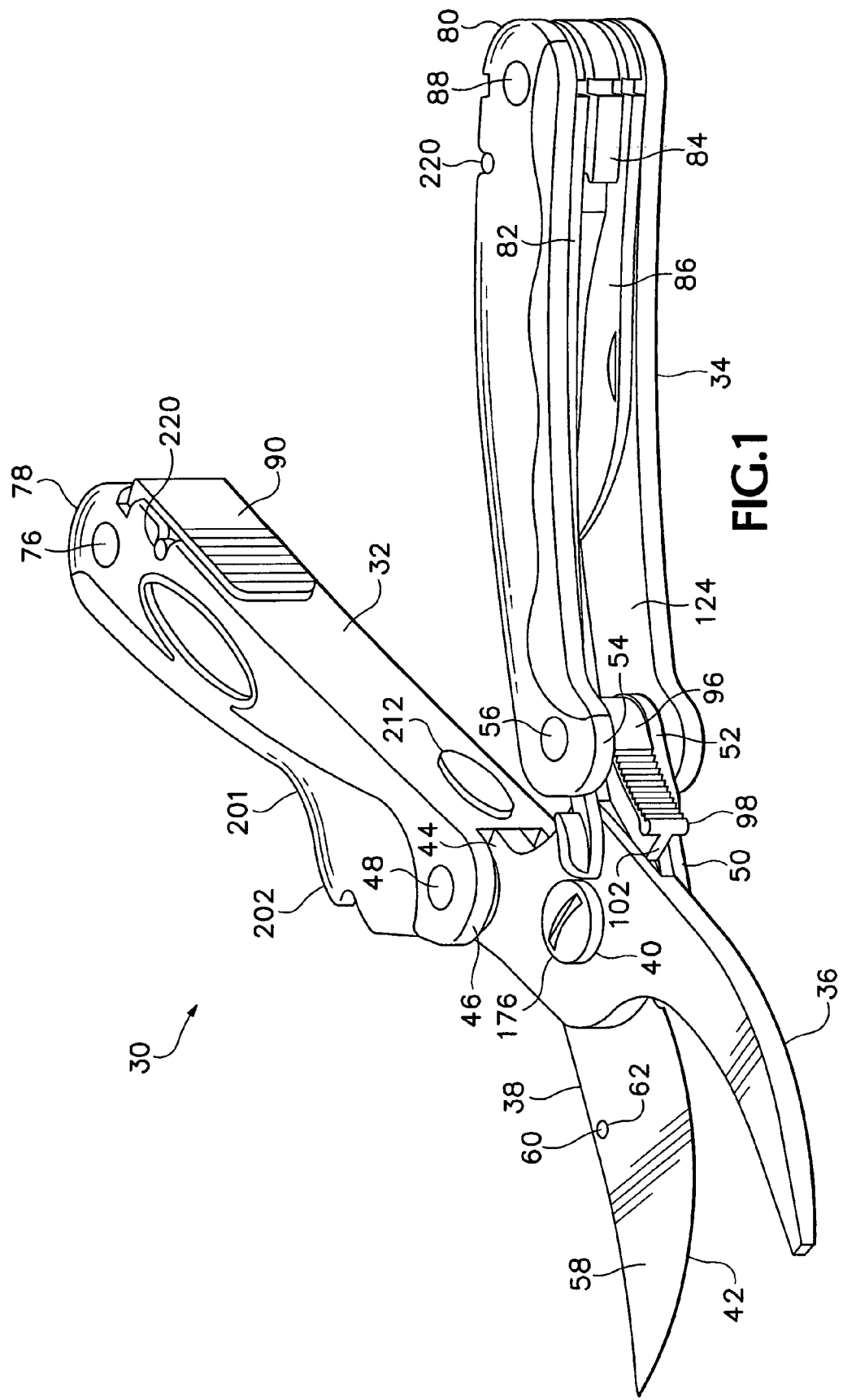
FIG. 1 is an isometric view from the lower left front of a folding multipurpose tool which is one embodiment of the present invention, shown with its handles extended, ready for use of the shears incorporated in the tool.

Referring now to the drawings forming a part of the disclosure herein, a folding gardener's multipurpose tool that is one preferred embodiment of the present invention is shown in FIG. 1. The tool 30 has a pair of handles 32 and 34 attached respectively to a jaw 36 and a cooperating cutting blade assembly 38 of a pair of pruning shears. The handles 32 and 34 have the general form of U-shaped elongate channels facing openly apart from each other as shown in FIG. 1 when they are extended.

The jaw 36 and the cutting blade assembly 38 are interconnected with each other and movable relative to each other about a blade pivot joint 40. Movement of the handles 32 and 34 toward each other causes the jaw 36 to move toward the blade assembly 38 about the blade pivot joint 40 in a scissors action. The jaw 36 is a bypass supporting jaw and supports a branch or other item being cut, as a sharp edge 42 passes closely alongside the jaw 36 in a bypass shears fashion in the tool 30. In another version of the tool the jaw 36 might instead include an anvil against which the sharp edge 42 could be brought to bear instead of passing by it.

Figure 2:
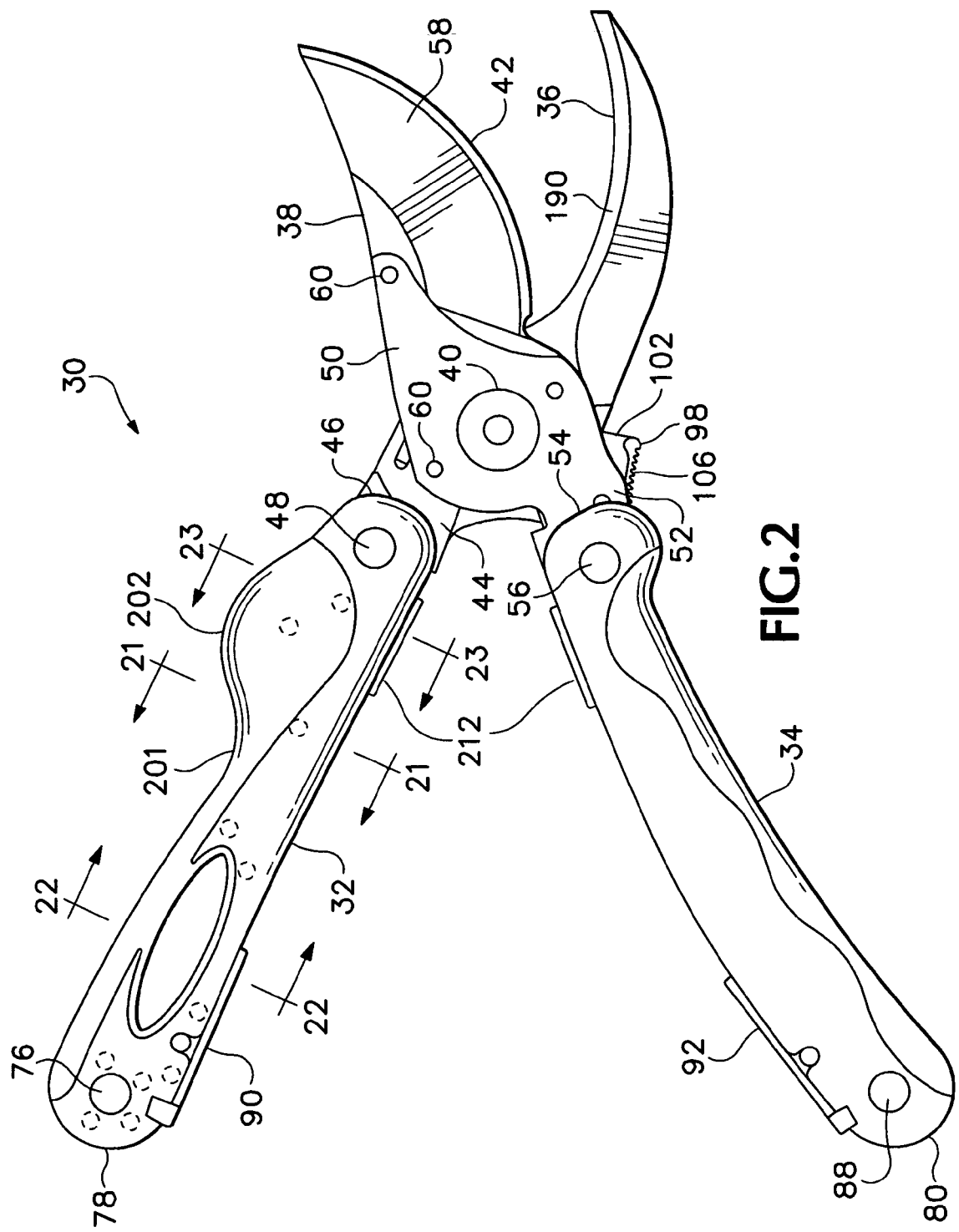
FIG. 2 is a side elevational view of the tool shown in FIG. 1, taken from the opposite, or right side.

Referring now also to FIG. 2, the jaw 36 has a base 44 attached to a front end 46 of the handle 32 by a handle pivot joint 48. The blade assembly 38 includes a blade carrier 50 that has a tang 52 attached to the front end 54 of the handle 34 by a handle pivot joint 56 including a pivot shaft 57. When the pruning shears of the folding multipurpose gardener's tool 30 are used, the handles 32 and 34 are in the extended positions shown in FIGS. 1 and 2 with respect to the jaw 36 and the blade assembly 38.

A replaceable cutter 58 including the sharp edge 42 is mounted on the blade carrier 50. The replaceable cutter 58 is coupled to and carried along with the blade carrier 50 by drive pins 60 mounted fixedly in the blade carrier 50 and engaged snugly but removably in corresponding holes 62 in the replaceable cutter 58. The cutter 58 can be removed and replaced by disassembling the blade pivot joint 40, allowing the replaceable cutter 58 to be lifted free from the pins 60. Ordinarily the pivot joint 40 holds he blade carrier 50 close enough to the jaw 36 so that the replaceable cutter 58 is held firmly against the blade carrier 50.

When the shears are not to be used, the handles 32 and 34 can be pivoted about the handle pivot joints 48 and 56, respectively, to place the folding multipurpose gardener's tool 30 into a folded configuration shown in FIGS. 3, 4, 5, 6, 7, and 8, in which the handles 32 and 34 lie alongside each other and the jaw 36 and blade assembly 38 are housed within and between the handles 32 and 34.

Figure 9:
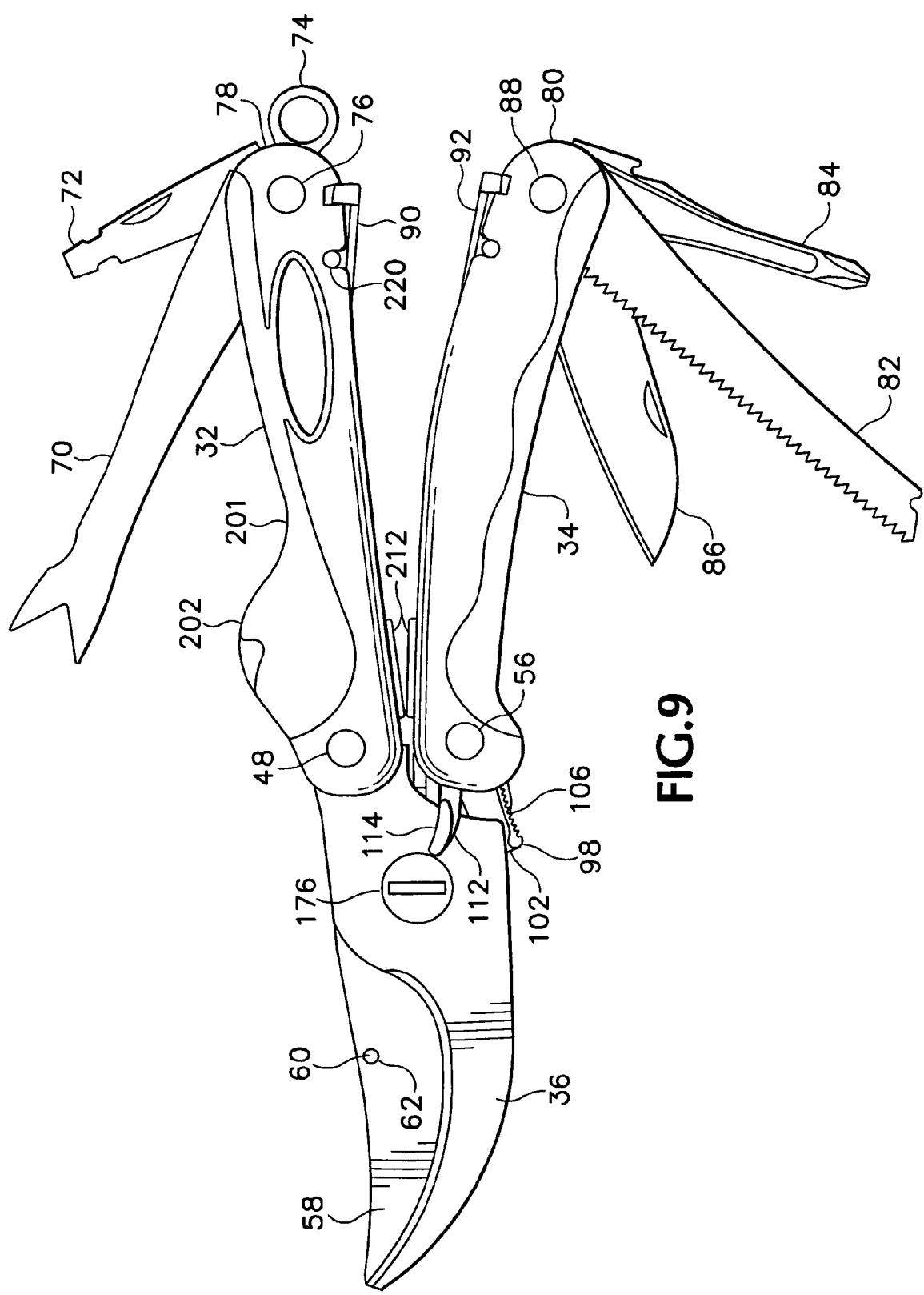
FIG. 9 is a side elevational view of the tool shown in FIG. 1, with the shears locked in a closed position and with several blades shown partially unfolded from their stowed positions in the handles of the tool.

Selected folding tool blades and bits are housed within each of the handles 32 and 34. In one embodiment of the folding tool 30, as shown in FIG. 9, the handle 32 houses a swallowtail weeder 70, a combination straight screwdriver and lawn sprinkler tool 72, and a lanyard attachment loop 74, all mounted on a blade pivot shaft 76 at the rear or outer end 78 of the handle 32. In the handle 34, at its outer end 80, are a saw blade 82, a Phillips screwdriver 84, and a knife blade 86, all mounted on a blade pivot shaft 88.

As shown in FIGS. 9, 10, and 11, each of the tool elements and blades 70, 72, 82, 84, and 86, as well as the lanyard loop 74, is movable about the respective pivot shaft 76 or 88 between a stowed position within the respective handle 32 or 34 and an extended, or deployed, position. Each tool blade is located on its respective pivot shaft 76 or 88 as by a spacer 87 or 89 so as to leave adequate space within the respective handle 32 or 34 for the jaw 36 and blade assembly 38 to be received within the handles 32 and 34 between the stowed tool blades in each handle. The spacers 87 and 89 also provide space to avoid accumulation of moisture or dirt that might cause corrosion on the tool elements and blades.

A selected one of the folding tool elements or blades can be held securely in its extended position by a latch mechanism controlled by a latch release lever 90 mounted on the handle 32 or a similar latch release lever 92 mounted on the handle 34, as shown in FIGS. 2, 9, 24, and 25.

Pruning Shears and Blade Safety Lock

When the handles 32 and 34 are extended with respect to the jaw 36 and the blade assembly 38, for the sake of safety it is desirable for the blade assembly 38 to be locked in place with respect to the jaw 36 when the shears are not actually being used, so that the sharp edge 42 is not exposed where it might injure a person accidentally. Accordingly, as shown in FIGS. 9, 12, 13, and 14, a blade safety lock mechanism designated generally by the reference numeral 96 can be engaged between the front end 54 of the handle 34 and the jaw 36, to hold the blade assembly 38 alongside the jaw 36.

Figure 12:
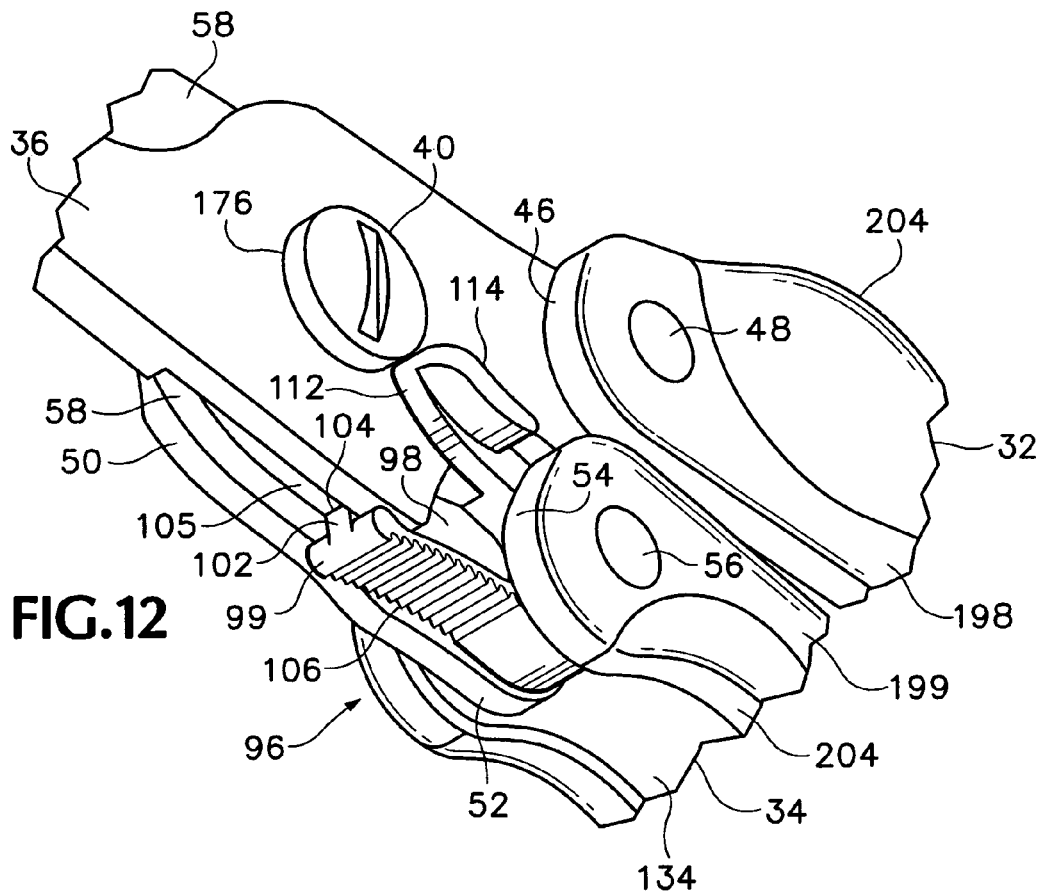
FIG. 12 is a detail view showing the front ends of the handles of a tool similar to that shown in FIGS. 1-11, with the blade safety lock keeping the blades in a closed condition.
Figure 13:
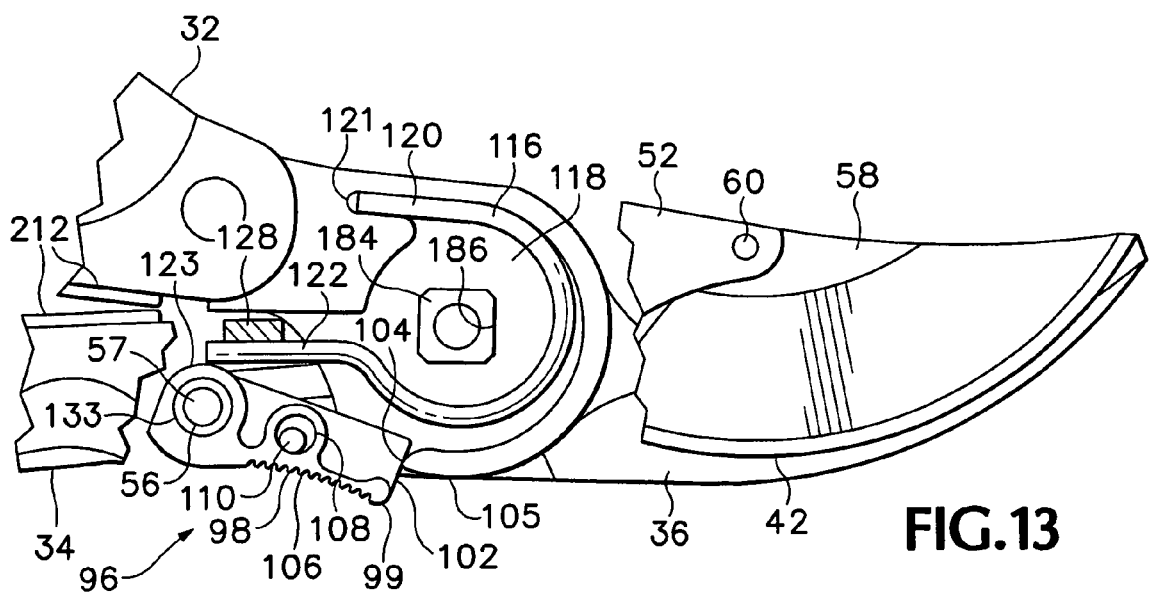
FIG. 13 is a partially cutaway side elevational view, taken from the right side of the tool shown in FIG. 12, showing the shears and front end portions of the handles of the tool.

The blade safety lock 96 includes a catch body 98 carried on a suitable pivot, and shown herein as mounted on the handle pivot joint 56. As shown in FIGS. 12 and 13, the catch body 98 has an outer end 99, and a pivot bore 100 is defined in the rear end of the catch body 98. The pivot shaft 57 of the handle pivot joint 56 extends through the pivot bore 100, permitting the catch body 98 to rotate through a small angle, between its position of engagement with the hub of the jaw 36 and a disengaged position shown in FIG. 14. As shown in FIG. 13, when the blade safety lock 96 is engaged, it holds the blade assembly 38 so that the sharp edge 42 is safely located alongside the flat side surface 190 of the jaw 36 and the handles 32 and 34 are close together.

As shown best in FIG. 13, a front face 102 of the catch body 98 engages a shoulder 104 defined along the peripheral surface 105 of the hub of the jaw 36 when the blade safety lock 96 is engaged. The catch body 98 can be engaged with the jaws 36 by pressing on a thumb pad 106 when the handles 32 and 34 are held close together, in the position shown in FIG. 9. The thumb pad 106 preferably has a non-slip surface configuration such as narrow parallel ridges and grooves. The range of angular motion of the catch body 98 about the handle pivot joint 56 is limited by the free space available within an opening 108 defined in the catch body 98 and surrounding a pin 110 extending from the tang 52 of the blade carrier 50. It will be understood that if desired, the catch body 98 might instead be mounted so as to pivot about, for example, the pin 110, and have its range of motion limited by its relationship with a part of the handle pivot joint 56.

A release lever 112 is attached to the catch body 98 and extends forward from the handle pivot joint 56, alongside the hub of the jaw 36. The release lever 112 has a thumb pad 114 spaced apart from the thumb pad 106 of the catch body 98 by an angle of, for example, about 35°, about the handle pivot joint 56 in the tool shown. The angle is not critical but is preferably chosen to place the thumb pad 114 conveniently for use. The thumb pad 114 is thus located, as may be seen in FIGS. 9 and 12, in a position where it is easily engaged by the thumb of a person's right hand grasping the handles 32 and 34 of the tool 30 in a normal fashion for use of the pruning shears. The tool 30 could also be made in a mirror-image left handed version (not shown).

Figure 14:
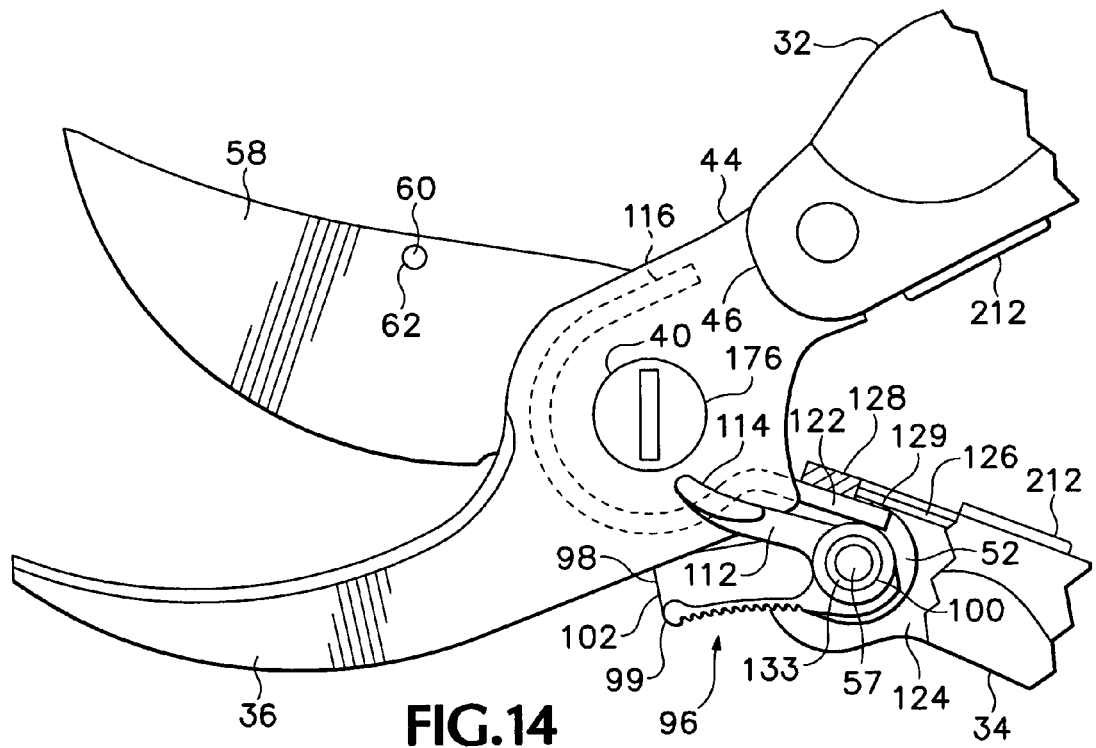
FIG. 14 is a partially cutaway left side elevational view of the cutting blade and jaw of the tool shown in FIG. 12, together with front end portions of the handles, with the shears in an open position.

As shown in FIGS. 13 and 14, a blade-opening spring 116 is housed in a cavity 118 defined around the blade pivot joint 40 in the hub of the jaw 36. A first end 120 of the spring 116 is held by being engaged in a groove 121 extending away from the cavity 118 into the base 44 of the jaw 36. A main part of the spring 116 extends arcuately about the blade pivot joint 40, and an opposite end 122 extends away from the hub of the jaw 36 toward the front end 54 of the handle 34 and presses against the surface 123 of the hub of the catch body 98, as shown in FIG. 13. Alternatively, the end 122 might press on an appropriate shoulder or other perch (not shown) on the tang 52. The spring 116 when in place is bent elastically and urges the tang 52 of the blade assembly 38 to pivot away from the base 44 of the jaw 36 about the blade pivot joint 40, thus also urging the handles 32 and 34 apart from each other.

The blade safety lock 96 can be engaged by pushing the thumb pad 106 to urge the front face 102 of the catch body 98 into its latching position alongside the shoulder 104 while holding together the handles 32 and 34. When the handles 32 and 34 are then released, the spring 116 urges the jaw 36 to rotate about the pivot joint 40 with respect to the blade assembly 38, bringing the shoulder 104 tightly against the front face 102. Friction then retains the catch body 98 in its engaged position, shown in FIG. 13, or the front face 102 and the shoulder 104 may be slightly sloped as shown in FIG. 13, so as to latch with each other by cam action, to keep the jaw 36 and blade assembly 38 closely alongside each other.

When it is desired to release the blade safety lock 96, pressure can conveniently be applied to the thumb pad 114, using the thumb of the hand holding the tool 30. A normal one-handed grip squeezing the handles 32 and 34 together while pushing on the thumb pad 114 will tend to counter the force of the blade-opening spring 116, thus releasing pressure of the front face 102 on the shoulder 104 and facilitating movement of the catch body 98 to remove the front face 102 from its position of interference with the shoulder 104. The blade assembly 38 is then free to move away from the jaw 36 toward the position shown in FIG. 14.

Figure 15:
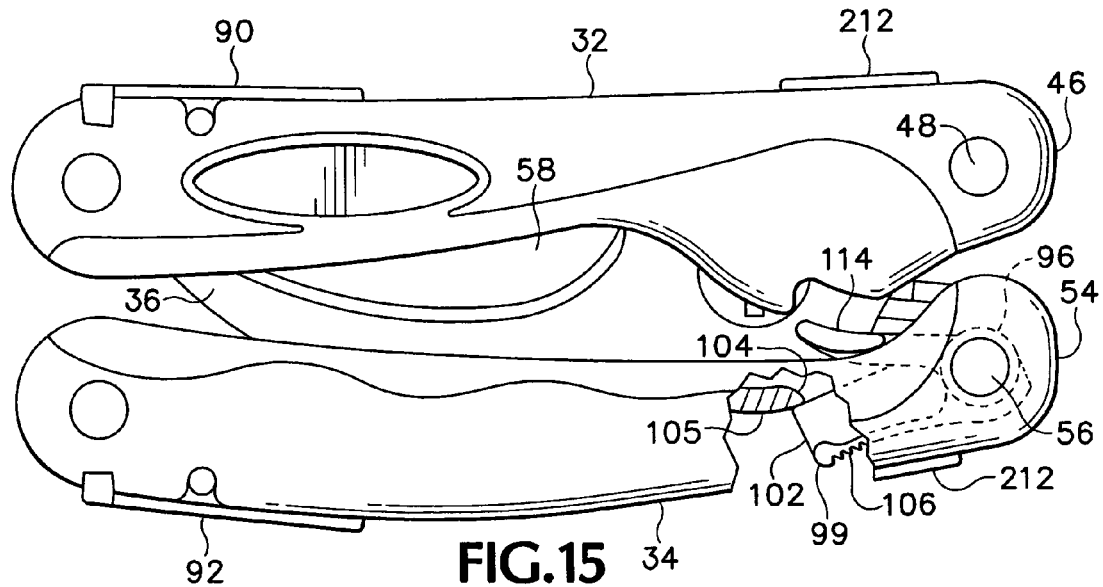
FIG. 15 is a partially cutaway view similar to that of FIG. 3, but with the handles not fully closed and the blade safety lock not fully engaged.
Figure 18:
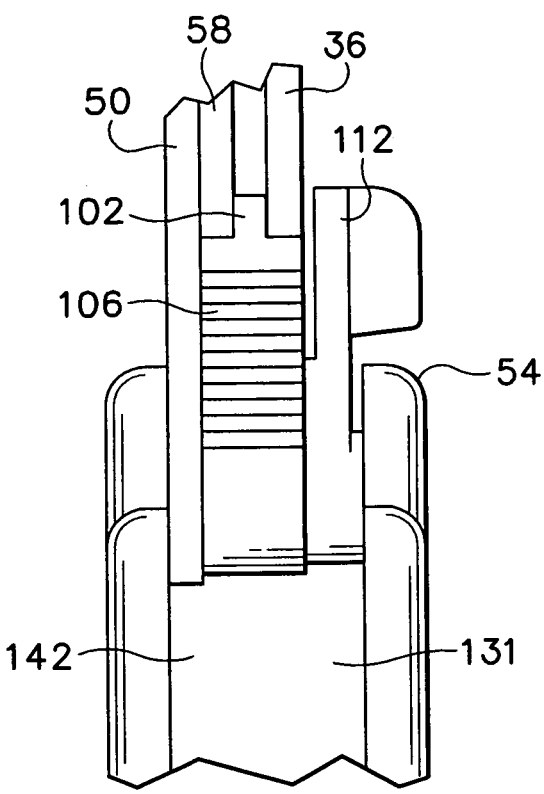
FIG. 18 is a detail view of the tool shown in FIG. 17, taken in the direction indicated by line 18-18 in FIG. 17.

In one preferred embodiment of the folding multipurpose gardener's tool 30, as shown in FIG. 15, the action of moving the handles 32 and 34 toward their folded configuration, to house the jaw 36 and blade assembly 38 between and within the channels defined by the handles 32 and 34, engages the blade safety lock 96. When the handles 32 and 34 are nearly folded about the pivot joints 48 and 56, the handles 32 and 34 squeeze the jaw 36 and the blade assembly 38 together, and the resulting pressure of the interior of the handle 34 against the catch body 98 urges it toward the blade pivot joint 40. The outer end 99 of the catch body 98 follows the peripheral surface 105 of the outside of the jaw 36 until the front face 102 reaches a point where it moves into the cavity 118 and engages the shoulder 104. As this happens, the handles 32 and 34 free to move from being slightly separated, as shown in FIG. 15, to the fully folded configuration shown in FIG. 3. Once the tool 30 is in the fully folded configuration shown in FIG. 3, the blade lock 96 is engaged. Thereafter, the handles 32 and 34 can safely be moved apart from each other about the handle pivot joints 48 and 56 to extend the handles 32 and 34 with respect to the jaw 36 and blade assembly 38 without the blade assembly 38 moving relative to the jaw 36 and exposing the sharp edge 42.

Referring again to FIGS. 13 and 14 and also referring now to FIG. 16, in one embodiment of the folding multipurpose tool 30, the tang 52 of the blade carrier 50 is mounted rotatably on the pivot shaft 57 of the handle pivot joint 56 alongside the catch body 98. The handle 34 and the tang 52 rotate with respect to each other during movement of the handle 34 between its position of extension with respect to the blade assembly 38, shown in FIG. 1, and the folded configuration of the multipurpose tool 30, shown in FIG. 3.

Referring to FIG. 16, the handle 34 preferably includes a channel 124 of formed sheet steel as its main strength member. With the handle 34 extended with respect to the blade assembly 38 during use of the pruning shear, force exerted on the handle 34 is transferred into the blade assembly 38 through the handle pivot joint 56 and through the base 126 of the U-shaped channel member 124, acting against a leg 128 extending from the main portion of the tang 52 of the blade carrier 50.

The leg 128 is aligned with an abutment face 130 of the base 126 of the channel 124, located at the front end 54 of the handle 34. Preferably, the blade carrier 50 is made of suitable sheet metal cut to the appropriate shape, as by fine blanking, after which the leg 128 may be bent to the appropriate angle with respect to the remainder of the blade carrier 50, to align the leg 128 with the abutment face 130, as shown in FIGS. 14 and 16.

Figure 20:
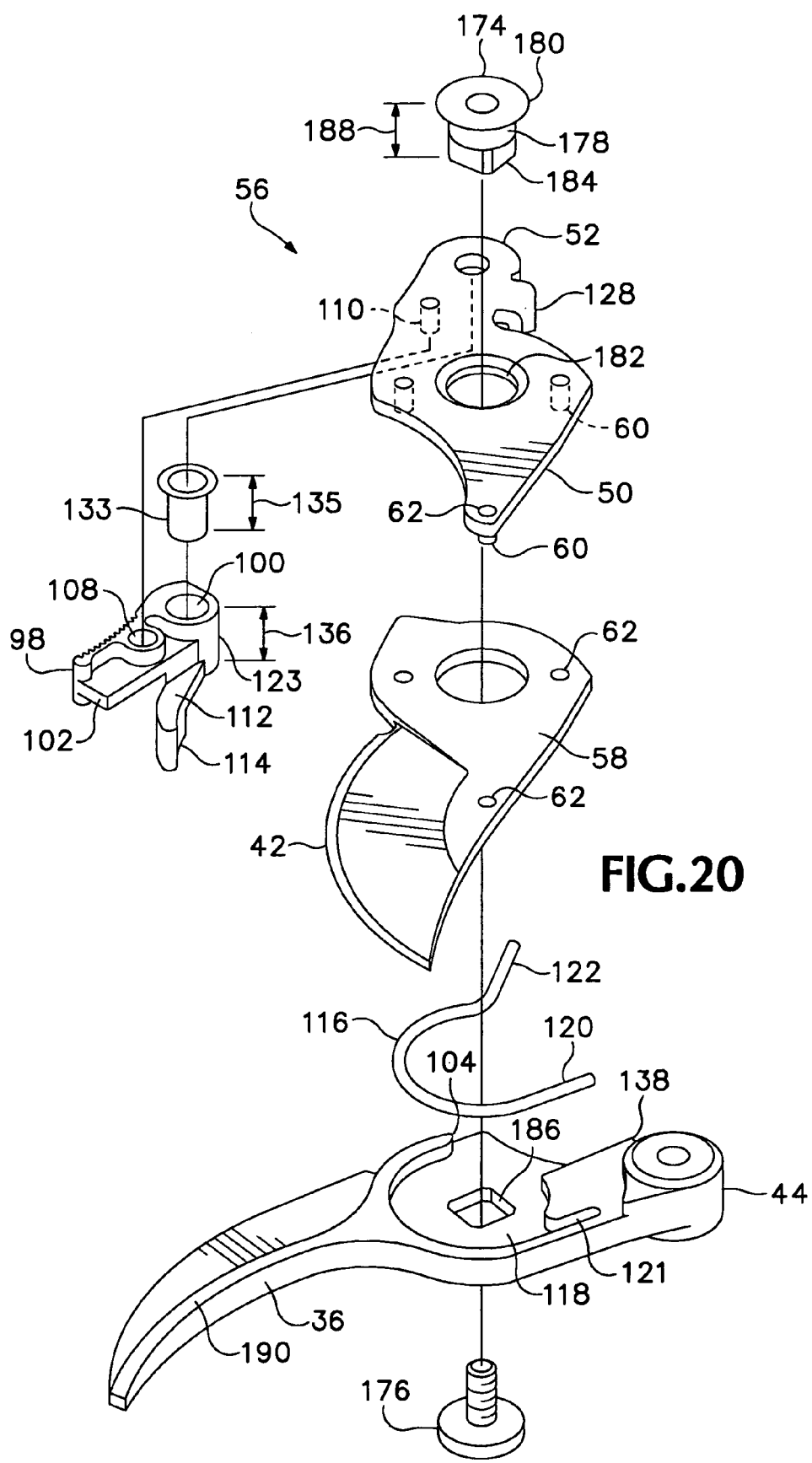
FIG. 20 is an exploded isometric view of the jaw and the blade assembly of the tool shown in FIG. 1.

Friction may be provided to help prevent the handle 34 from rotating too freely with respect to the tang 52 by adjusting the tension in the pivot shaft 57 of the handle pivot joint 56, which may, for example, be a screw-fastened hollow pin. To keep the latch body 98 free to be moved as desired to engage or disengage the blade safety lock 96, a spacer sleeve 133, seen best in FIG. 20, is provided in the pivot joint 56 between the tang 52 and the opposite side wall 125 of the channel 124. The spacer sleeve 133 fits on the pivot shaft 57 of the pivot joint 56, and fits inside the pivot bore 100 loosely enough for the catch body 98 to rotate freely. It has a length 135 slightly greater than the width 136 of the catch body 98. The catch body 98 thus is kept free to move on the spacer sleeve 133 between the side walls 125, and the spacer sleeve 133 holds the tang 52 securely in place against one of the side walls 125 and properly aligned with the handle 34.

Figure 19:
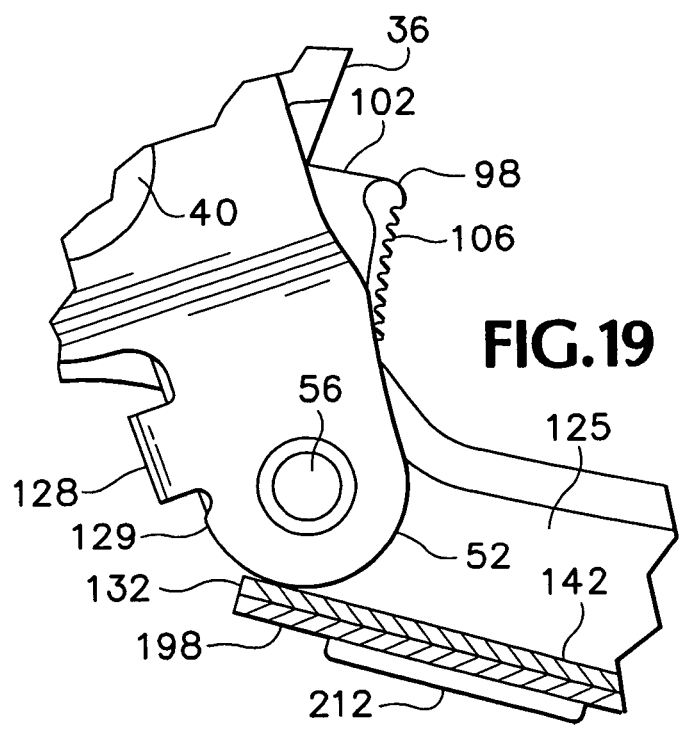
FIG. 19 is a fragmentary view similar to a portion of FIG. 17, showing a handle in a partially folded position with respect to the blade assembly.

Additional friction may be provided to keep the handle 34 in its extended position with respect to the tang 52 of the blade carrier 50 by providing a wedge-like or cam-like protrusion 129, best seen in FIGS. 16, 17, and 19, on the tang 52 in position to press against the interior surface of the base 126 of the channel 124 as the handle 34 approaches being fully extended.

As may be seen best in FIG. 16, a metal channel member 131 that is the main strength member of the handle 32 has an abutment face 132 adjacent the front end 46 of the base portion 142 of the metal channel 131 of the handle 32, and the base 44 of the jaw 36 is mounted on the handle pivot joint 48 between the side walls 134 of the channel 131. The jaw 36 is preferably of metal and may be made as a casting or by powder metallurgy methods in order to minimize machine work necessary to provide the required shape. Its base 44 includes a boss substantially filling the space between the side walls 134. A shoulder 138 is provided on the base 44, to engage and be supported by the abutment face 132 when the handle 32 is extended with respect to the jaw 36, in order to transfer forces from the handle 32 into the jaw 36. A wedge-like or cam-like protrusion 140 shown best in FIG. 16 may also be provided on the base 44 of the jaw 36 where it will engage the interior of the channel base portion 142 with friction sufficient to prevent the handle 32 from rotating about the handle pivot joint 48 unless it is definitely desired to fold the handle 32 with respect to the jaw 36.

Replaceable Cutter

As mentioned previously, the blade or cutter 58 is easily replaceable when damaged and may easily be removed to permit sharpening when dulled through long use, and may then easily be remounted on the blade carrier 50. The pruning shear portion of the tool 30 is shown in FIG. 20, without its handles and associated additional blades, in an exploded view showing the cutter or blade 58 separated from the blade carrier 50, with the blade pivot joint 40 disassembled.

The blade pivot joint 40 preferably incorporates a pivot axle including a nut or female portion 174 and an adjustment screw 176. A circular shank 178 and a radial flange 180 at an outer end of the female portion 174 are received rotatably in a corresponding pivot bore 182 defined in the blade carrier 50. Preferably the pivot bore 182 is counterbored to receive the flange 180, and the shank 178 and flange 180 should be easily rotatable in the bore 182. The opposite or inner end portion 184 of the female portion 174, in contrast, although small enough to pass through the bore 182, is not circular, but is square or of another shape which can be held non-rotatably in a corresponding hole 186 in the hub of the jaw 36, to prevent rotation of the female portion 174 with respect to the hub portion of the jaw 36. The hole 186 receives the inner end portion 184 of the female portion 174 but preferably substantially prevents rotation of the female portion 174 with respect to the jaw 36. As a result, the screw 176, once tightened into the female portion 174, is not subjected to rotary oscillation tending to loosen it from the female portion 174 as the pruning shear is used. The angular movement of the blade carrier 38 with respect to the jaw 36 is supported substantially entirely by the rotation of the blade carrier 52 with respect to the female portion 174. Additionally, the female portion 174 is preferably constructed as a locknut, as by including a Nylon plug, a setscrew, or another device to engage the threads of the screw 176.

The length 188 of the female portion 174 of the pivot axle of the blade pivot joint 40 is chosen to permit adjustment of the blade pivot joint 40 to achieve a desired amount of tension by tightening the adjustment screw 176 to the appropriate distance into the female portion 174 while the end portion 184 remains non-rotatably engaged in the hole 186 in the hub of the jaw 36. Adjustment of the pivot axle in this fashion can thus account for cutters 58 of different thicknesses, wear of the planar face 190 of the jaw 36, against which the replaceable cutter 58 moves, and for wear of parts in contact with each other in the rotational relationship between the flange 180, shank 178, and pivot bore 182 in the blade carrier 50. The properly tightened pivot axle also holds the blade carrier 50 tightly against the adjacent side of the replaceable cutter 58, thus keeping the pins 60 engaged in the holes 62 to drive the cutter 58 during use of the pruning shear. It will be recognized that the pivot axle could be arranged oppositely, as well, with the same result.

Handle Comfort

Figure 21:
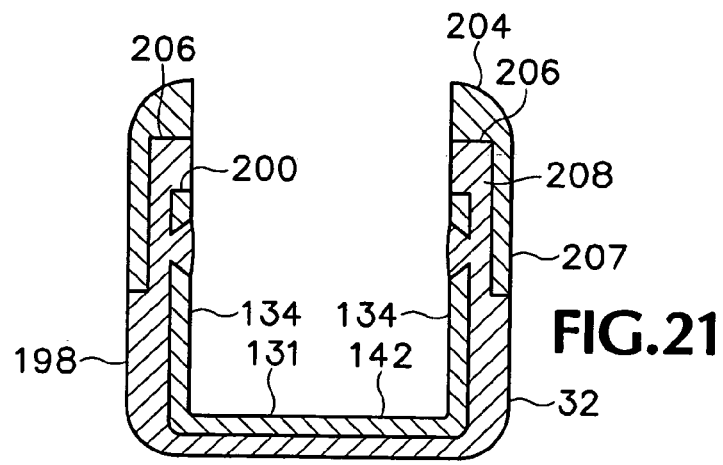
FIG. 21 is a section view of one of the handles of the tool shown in FIGS. 1-11, taken along line 21-21 in FIG. 2.
Figure 22:
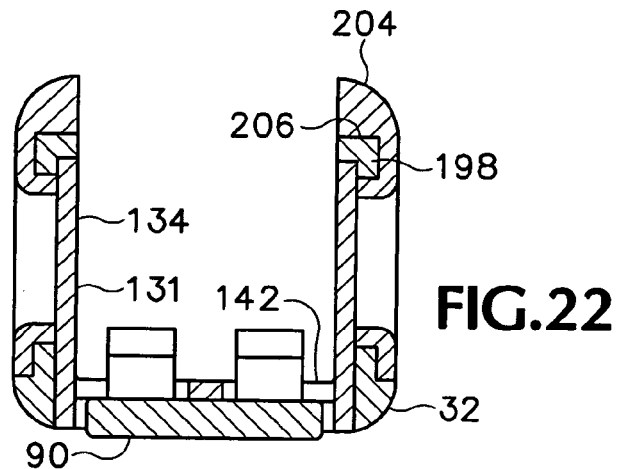
FIG. 22 is a section view of one of the handles of the tool shown in FIGS. 1-11, taken along line 22-22 of FIG. 2.
Figure 23:
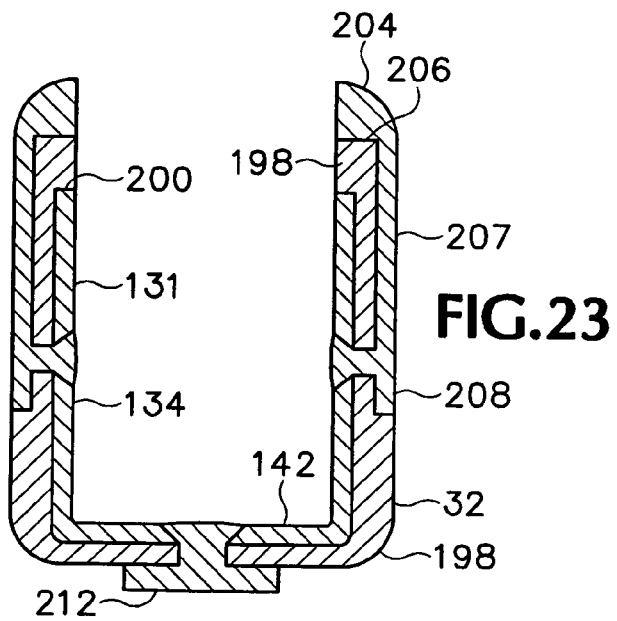
FIG. 23 is a section view of one of the handles, taken along line 23-23 of FIG. 2.

Referring again to FIGS. 1, 2, 10, and 11, and also referring to FIGS. 21-23, the handles 32 and 34 have a generally U-shaped channel configuration, and are constructed to have sufficient strength and attractive appearance, and to be comfortable in use of the shear.

The inner channel frame member 131 is part of the handle 32, and a similar channel frame member 124 is part of handle 34. The channel 131 includes a channel base portion 142 and a pair of parallel side wall portions 134. The side wall portions 134 extend the entire length of the handle 32 and support a molded shell portion 198 as an intermediate handle portion fitting around the channel member 131 and interlocking with margins 200 of the side walls 134 of the channel member 131. A shell portion 199 of similar construction, although different in shape, is used in the handle 34, as shown in FIG.12.

The shell portions 198 and 199 of the handles 32 and 34 are preferably molded of a suitable rigid, strong, thermoplastic material such as a fiber-reinforced or glass-filled Nylon that is easily molded to provide a desired shape and adequate strength and that may be provided in a desired color for attractive appearance of the tool including such an intermediate handle portion.

The side walls of the handle 32 are tapered in profile, from the rear end 78 to a shallowest point 201, adjacent which is a hump 202 to support the user's grip. The side walls of the handle 34 are also tapered in profile, from its outer end 80 toward its front end 54.

A respective comfortable cushioning portion including a grip cushioning layer 204 extends along each of the outer margins 206 of the shell layers 198 and 199 as a cushioning portion of each handle 32 and 34. The grip cushioning layer 204 is preferably made of a tough, yet resiliently soft and rubber-like thermoplastic elastomeric material such as those available from Advanced Elastomer Systems, of Akron, Ohio, under the trademark Santoprene®. A portion 207 of the comfortable grip cushioning layer also extends along and covers a portion of an outer face 208 of the shell portion 198. The grip cushioning layer portion 204 is preferably attached to the channel member 131 or 124 and the shell layer 198 or 199 by chemical bonding and adhesion resulting from the process of molding and by being shaped to interlock mechanically with the shell layer 198 or 199 at certain places. For example, openings may be provided in the side portions of the shell layer 198 or 199, and the side walls 134 and 125, to provide for mechanical interlocking, as shown with respect to the handle 32 in FIGS. 21, 22, and 23.

Near the front ends 46 and 54 of the handles 32 and 34, a cushioning limit stop 212 of structure similar to the cushioning layer 204 is provided on each of the handles 32 and 34, as shown in FIGS. 4 and 23 with respect to handle 32. The limit stops 212 engage each other as the handles 32 and 34 approach each other during use of the shears when the blade assembly 38 is alongside the jaw 36, as shown, for example, in FIG. 9. These stops 212 prevent the handles 32 and 34 from being squeezed too tightly together and also protect the user's hands from unnecessary and undesirable shock as the cutter 58 finally passes through an object such as a thick branch being cut by the pruning shear.

The handles 32 and 34 are preferably assembled by first placing the respective channel member 124 or 131 in a suitable mold cavity and then molding the shell layer 198 or 199 onto the channel member 131 or 124. The channel member and molded layer 198 or 199 are then placed into a second mold cavity and the elastomeric material forming the cushioning layer 204 and the limit stop 212 is overmolded into place. Conventional molding methods are used to provide both mechanical and chemical bonding among the channel members 124 and 131 and the molded parts 198, 199, 204, and 212.

Figure 24:
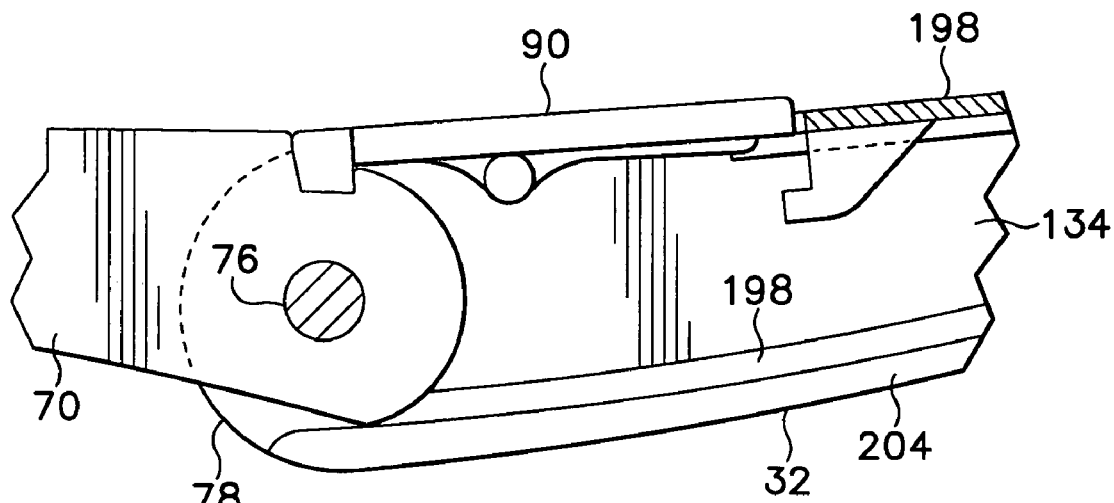
FIG. 24 is a partially cutaway detail view of one of the handles of the multipurpose tool shown in FIGS. 1-11, showing the weeder locked in its extended position.
Figure 25:
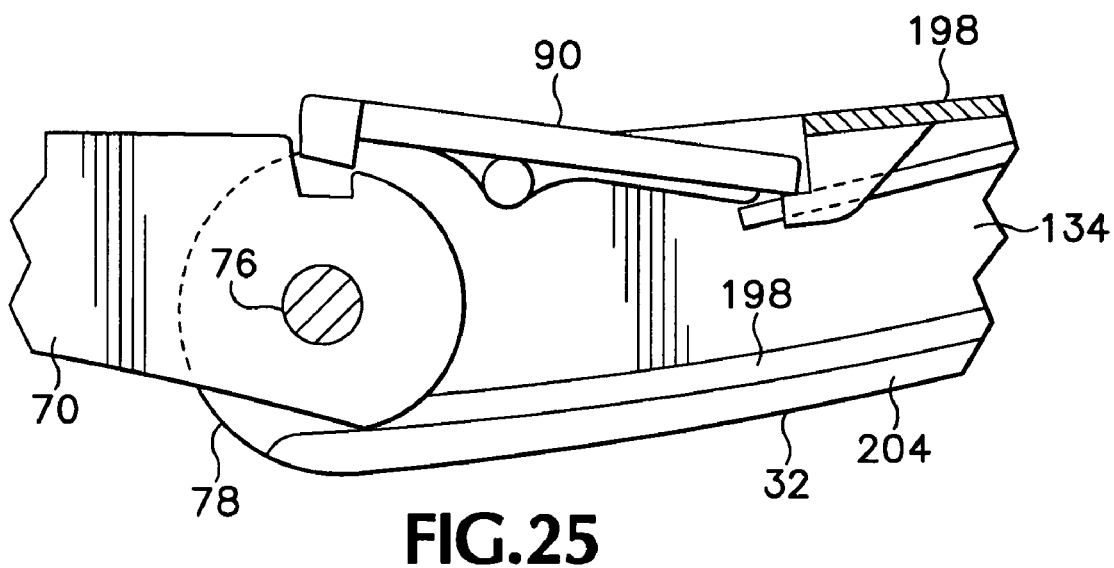
FIG. 25 is a view similar to FIG. 24, showing the latch release lever pressed to a position for releasing a folding tool element or blade from its extended position.

A tool blade member mounted pivotably within one of the handles 32 and 34 at its outer end 78 or 80 may be held securely in its extended position by the action of a latch mechanism including the respective latch lever 90 or 92 attached to the main channel member 131 or 124 of the respective handle by a respective latch lever pivot 220. The handle 32 and latch release lever 90 are shown in FIGS. 9, 24, and 25, and the latch mechanisms are similar in the handle 34. The latch levers 90 or 92 are preferably cast or formed by powder metallurgy methods.

As the latching mechanisms do not form a part of the present invention, they are not described in detail herein.

Figure 26:
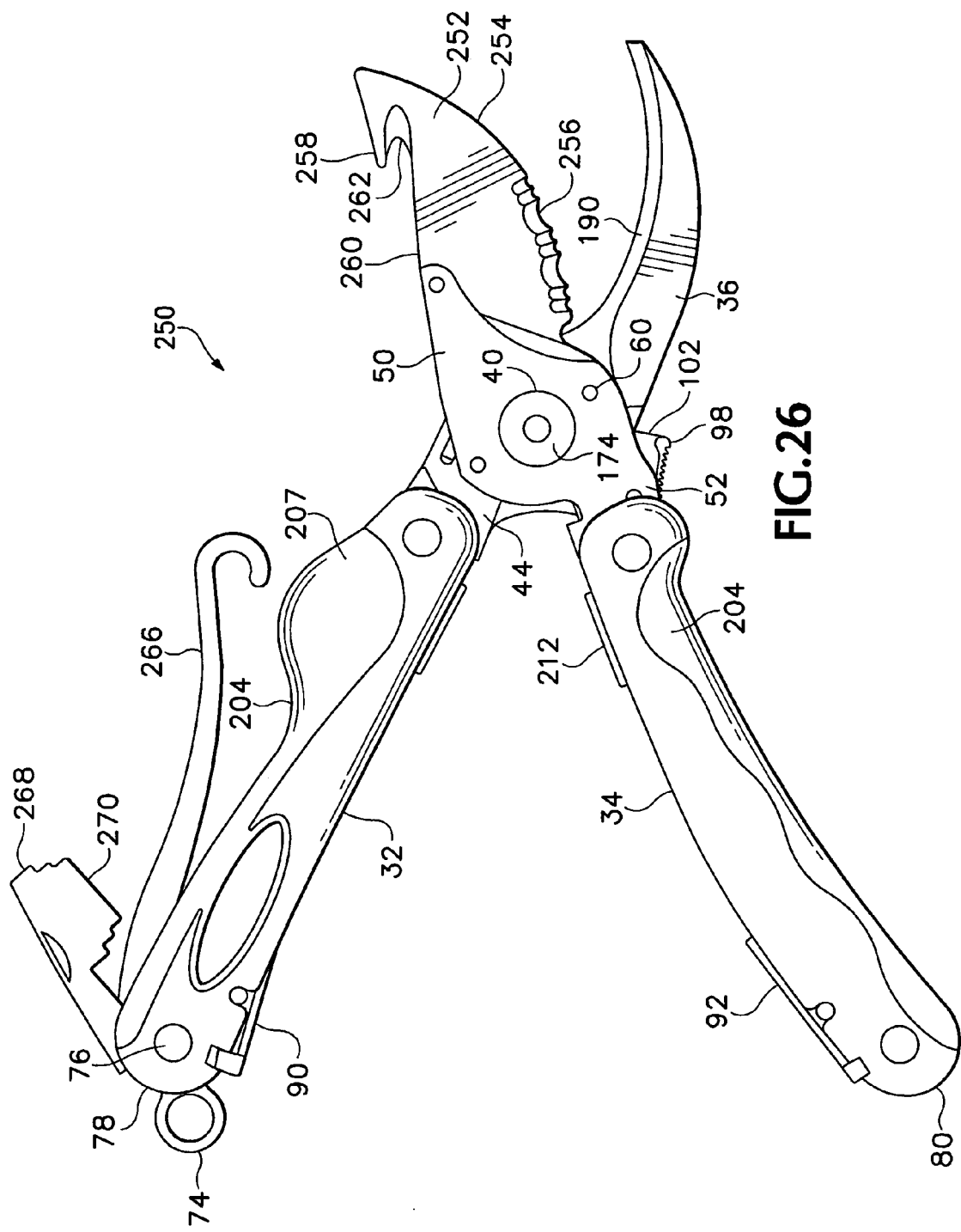
FIG. 26 is a view of a multipurpose folding tool particularly suited for use by hunters, taken in the same direction as FIG. 2 and showing a pair of folding tool elements particularly intended for use by hunters in a partially open position.

A folding multipurpose tool 250 shown in FIG. 26 is more particularly adapted for convenient use by a hunter instead of a gardener, and includes a different embodiment of some aspects of the invention. The tool 250 is in most respects similar to the folding multipurpose gardener's tool 30, and like parts are indicated by the same reference numerals as used above in connection with the tool 30. The tool 250 has a blade assembly equipped with a replaceable cutter 252 whose sharpened edge includes a gently curved front portion 254 and may include serration in a rear portion 256. Both edge portions 254 and 256 are located to operate cooperatively with the jaw 36 as a cutting blade of a pair of shears. The replaceable cutter 252 also includes a hook 258 extending outward from its back 260. The hook 258 includes a sharpened edge 262 in its throat, useful in skinning game or for other uses such as cutting twine or opening bags of fertilizer or the like, if the replaceable cutter 252 were included in a gardener's tool instead of the replaceable cutter 58.

Folding tools stowed selectively in the handle 32 of the tool 250 include a slender hook 266, useful in removing entrails from game birds and small animals. Also included is a screwdriver blade 268 that carries a shotgun choke tube tool 270.

Other specialized blades or tool elements might be provided in one or the other of the handles 32 and 34 in such a multipurpose folding tool 30 or 250 to make the tool particularly useful for other special purposes.

It will also be understood that instead of the combination of the pruning shears jaw 36 and blade assembly 38, the handles 32 and 34 might be used for other pivotally interconnected jaws or blades such as those of pliers, sheet metal shears, or other scissors-like cutting tools.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A cutting tool subassembly for a folding hand tool, comprising:
   (a) a jaw having a base;
   (b) a blade assembly, including a blade carrier having a tang and a sharpened cutter mounted removably on said blade carrier;
   (c) a blade pivot joint interconnecting said jaw with said blade carrier, said jaw and said blade carrier being movable relative to each other about a pivot axis of said blade pivot joint;
   (d) a first handle connected to said base of said jaw by a first handle pivot joint and movable about said first handle pivot joint between an extended, operative position and a folded position with respect to said jaw; and
   (e) a second handle connected to said tang of said blade carrier by a second handle pivot joint and movable about said second handle pivot joint between an extended, operative position and a folded position with respect to said blade carrier, and wherein said second handle includes an abutment face at an end thereof adjacent said second handle pivot joint, and wherein said tang includes a main portion in a first plane oriented normal to said pivot axis and a leg extending laterally away from said main portion in a second plane, said leg being aligned with said abutment face and resting against said abutment face when said second handle is in said extended operative position.

2. The subassembly of claim 1 wherein said second handle includes a channel having a pair of side walls and a base interconnecting said side walls and defining said abutment face.

3. The subassembly of claim 1 wherein said jaw is a bypass support jaw and said cutter is a bypass cutting blade arranged to cooperate with said jaw, and wherein said cutting tool is a pruning shear.

4. The subassembly of claim 1 wherein each of said handles defines a respective channel having a pair of channel side walls, said channels facing inwardly toward each other when said handles are in their folded positions and facing outwardly apart from each other when said handles are in their extended positions with respect to said jaw and said blade, and wherein each of said side walls of one of said handles includes cushioning portions of a resiliently soft thermoplastic elastomeric material overlying and extending along a margin thereof so as to cover said margin and present said resiliently soft thermoplastic elastomeric material along said margin for comfortable contact with a user's hand.

5. The subassembly of claim 4 wherein one of said channel side walls includes a supporting portion of metal and a molded shell layer of a rigid thermoplastic material attached thereto, and wherein said cushioning portions of resiliently soft thermoplastic elastomeric material are molded over said shell layer.

6. The subassembly of claim 4 wherein said cushioning portions are molded onto said margins of said side walls.

7. The subassembly of claim 1 wherein said blade pivot joint includes a tension screw and a locknut adjustably engaged therewith, said tension screw and locknut being arranged to keep said blade assembly and said jaw suitably closely alongside each other.

8. The subassembly of claim 1, including a blade safety lock carried on said second handle pivot joint and movable between an engaged position in which said blade safety lock engages said jaw and thereby holds said jaw in a closed position with respect to said blade assembly, and a disengaged position in which said jaw and said blade assembly are free to move between said closed position and an open position, said blade safety lock being arranged with respect to said second handle so that said second handle urges said blade safety lock into said engaged position when said second handle approaches said folded position thereof.

9. The subassembly of claim 8, wherein said blade safety lock includes a catch body that is mounted pivotably on said second handle pivot joint, said catch body defining an opening, and wherein said blade carrier has a pin projecting from said tang thereof, said pin being engaged in said opening and thereby limiting rotational motion of said catch body around said second handle pivot joint.

10. The subassembly of claim 1 wherein said sharpened cutter includes a hook portion at an outer end thereof, said hook portion facing openly away from said jaw and having a throat including a sharpened edge.

11. A subassembly for a folding hand tool, comprising:
   (a) a jaw having a base;
   (b) a blade including a blade base having a tang;
   (c) a blade pivot joint defining a pivot axis and interconnecting said jaw with said blade, said blade defining a blade plane normal to said pivot axis and said tang being parallel with said blade plane, said blade being movable about said blade pivot joint with respect to said jaw between an open position and a closed position;
   (d) a first handle including an abutment face;
   (e) a second handle attached to said base of said jaw;
   (f) a first handle pivot joint interconnecting said first handle with said tang, said first handle being movable about said handle pivot joint between an extended position and a folded position with respect to said blade; and
   (g) a leg attached to and extending laterally away from said tang in a plane normal to said blade plane, said leg being engaged against said abutment face when said first handle is in said extended position.

12. The subassembly of claim 11 wherein said first handle includes a channel having a channel base and a pair of side walls, and wherein said abutment face is a part of said channel base and said leg extends along and in contact with said abutment face when said first handle is in said extended position.

13. The subassembly of claim 11 wherein said first handle includes a channel having a pair of side walls and a channel base defining said abutment face, and wherein said tang includes a main portion and said leg extends laterally at an angle away from said main portion and is aligned with said abutment face and rests against said abutment face when said first handle is in said extended position.

14. The subassembly of claim 11 wherein said blade includes a hook portion at an outer end thereof, said hook portion facing openly away from said jaw and having a throat including a sharpened edge.

15. A subassembly for a folding hand tool, comprising:
(a) a jaw having a base;
(b) a blade having a generally planar tang;
(c) a blade pivot joint defining a pivot axis and interconnecting said jaw with said blade, said planar tang being oriented normal to said pivot axis and said blade being movable about said blade pivot joint with respect to said jaw between an open position and a closed position;
(d) a first handle including an abutment face and including a channel having a channel base and a pair of side walls, said abutment face being a part of said channel base;
(e) a second handle attached to said base of said jaw;
(f) a first handle pivot joint interconnecting said first handle with said tang, said first handle being movable about said handle pivot joint between an extended position and a folded position with respect to said blade; and
(g) a leg extending laterally away from said tang, said tang being oriented parallel with one of said side walls of said channel, and said leg being oriented parallel with said channel base and extending along and being engaged against and in contact with said abutment face when said first handle is in said extended position.

16. The subassembly of claim 15 wherein said tang of said blade and said leg are included in a single piece of sheet metal and said leg is a portion of said single piece located in a plane oriented at an appropriate angle to a plane including said tang to align said leg with said abutment face.

17. The subassembly of claim 15 wherein said blade includes a hook portion at an outer end thereof, said hook portion facing openly away from said jaw and having a throat including a sharpened edge.

* * * * *